United States Patent Office 2,970,993
Patented Feb. 7, 1961

2,970,993
METALLIZED DIANISIDINE DYES

Jack F. Morgan, Delmar, and David W. Vollmer, Loudonville, N.Y., assignors to General Aniline & Film Corporation, New York, N.Y., a corporation of Delaware No Drawing. Filed Aug. 3, 1954, Ser. No. 447,662

7 Claims. (Cl. 260—147)

This invention relates to novel coppered polyazo dyes yielding grey colorations directly on cellulosic fibers such as cotton and regenerated cellulose rayon, the resulting colorations having exceptional fastness to light, surviving anticrease treatment with melamine- or urea-formaldehyde resins without substantial diminution.

The dyestuffs of this invention are complex copper compounds of polyazo dyestuffs having the following general formula:

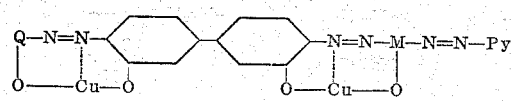

wherein Q is the radical of a terminal coupling component of the class consisting of naphthol- and aminonaphthol-mono- and -disulfonic acids (the adjacent azo group being ortho to the naphtholic hydroxyl group); M is the radical of a middle coupling component of the class consisting of 6 and 7-amino-1-naphthol-mono- and -di-sulfonic acids, and Py is a 5-pyrazolone coupling component.

The dyestuffs of this invention are prepared by coupling tetrazotized dianisidine in alkaline medium on the one hand with 1 mol of 6- or 7-amino-1-naphthol-mono- or -di-sulfonic acid, and on the other hand with 1 mol of a naphthol- or amino-naphthol-mono- and di-sulfonic acid having an unsubstituted nuclear position ortho to the naphtholic hydroxyl groups, diazotizing the amino group on the former component and coupling with 1 mol of a 5-pyrazolone coupling component.

The coupling operations are carried out in any convenient order. Thus, if coupling component Q contains a diazotizable amino group, tetrazotized dianisidine is first coupled with the component M, the amino group of the latter then diazotized and coupled with Py, and the resulting compound finally coupled with Q. Simultaneous coupling with Q and Py after initial coupling of tetrazotized dianisidine with 1 mol of M and subsequent diazotization, yields substantially the same results. Otherwise Q and M are coupled with tetrazotized dianisidine in either order, the resulting compound diazotized and finally coupled with Py.

The desulting triazo compound is subjected to coppering treatment by heating with an aqueous solution of a copper salt containing ammonia or a water-soluble amine, and the coppered dyestuffs recovered in the usual manner, e.g. by salting out and filtering. Preparation of dyestuffs in accordance with this invention is illustrated in the following examples, wherein parts and percentages are by weight unless otherwise indicated.

Example 1

24.4 parts of dianisidine are dissolved in a solution of 58 parts 20° Bé. hydrochloric acid and 200 parts of water, and the solution cooled to 15° C. by addition of ice. A solution of 14 parts of sodium nitrite in 30 parts of water is added. After 30 minutes, 25 parts of sodium bicarbonate are added, followed by slow addition of a neutral solution of 23.9 parts of 7-amino-1-naphthol-3-sulfonic acid in 200 parts of water. A coupling reaction takes place rapidly and is readily balanced at the point where no further tetrazotized dianisidine but only the diazo azo compound remains. The reaction mixture is acidified by adding 37.1 parts of 20° Bé. hydrochloric acid, and then cooled to 15 to 20° C. by addition of ice, and diazotized by adding a solution of 7 parts of sodium nitrite in 15 parts of water. After stirring 1 to 2 hours, the mixture is neutralized by sodium bicarbonate to a pH of 6. A neutral solution of 22.8 parts of 3-methyl-1-p-sulfophenyl-5-pyrazolone in 150 parts of water is slowly added to the mixture over a period of 15 to 20 minutes. There is thereupon rapidly added a neutral solution of 40 parts of 8-amino-1-naphthol-5,7-disulfonic acid in 200 parts of water, followed by immediate addition of a solution of 40 parts of sodium carbonate in 200 parts of water. The mixture is agitated for several hours to complete coupling. A solution of 62.5 parts of hydrated copper sulfate in 46 parts of methylamine in 400 parts of water is added and the resulting slurry is heated at 80 to 85° C. for 4 hours. The resulting dyestuff solution is evaporated to dryness, and the coppered dyestuff thereby recovered. The dyestuff thus produced has approximately the following formula:

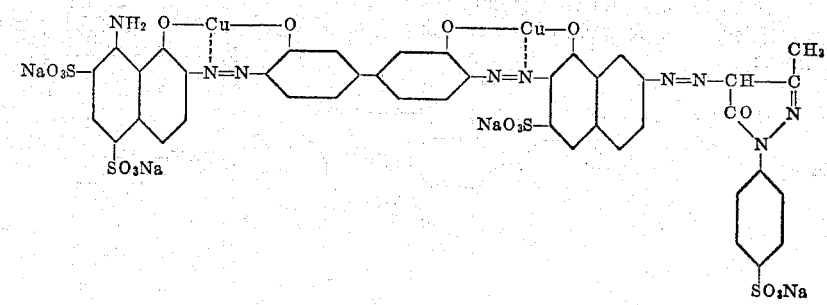

The aforesaid product dyes cotton and regenerated cellulose rayon desirable grey shades which are very fast to light and washing. Exceptional fastness to light is observed in dyeings produced therewith on regenerated cellulose rayon which survives even conventional anticrease treatment with melamine- or urea-formaldehyde resins.

Variations in the grey shade can be produced by changing the proportions, respectively, of the pyrazolone compound and the aminonaphthol-disulfonic acid employed as end components. Thus, by increasing the proportion of the pyrazolone compound and correspondingly decreasing the aminonaphthol-disulfonic acid, a somewhat redder shade of grey is produced, while converse variation produces a greener shade of grey. If the two end components are coupled simultaneously, a "scrambled" coupling results wherein the product is slightly duller and redder than the product of the example. Instead of methylamine, ammonia or other water-soluble primary aliphatic amines can be used in the coppering step without changing the resultant dyestuff.

Example 2

Preparation of a dyestuff by coupling in a different order is illustrated in this example. 24.4 parts of dianisidine is tetrazotized as in Example 1. 25 parts of sodium bicarbonate are added thereto, followed by slow addition of a neutral solution of 31.9 parts of 8-amino-1-naphthol-5,7-disulfonic acid in 250 parts of water so as to obtain a balance point where no further tetrazo compound remains in the mixture. The resulting slurry is added to a solution of 23.9 parts of 7-amino-1-naphthol-3-sulfonic acid and 40 parts of sodium carbonate in 200 parts of water. The resultant diazo compound is separated by salting out and filtering. The filter cake is slurried with 600 parts of water, and 6.9 parts of sodium nitrite are added. The resulting slurry is introduced into an agitated solution of 39 parts of 50% aqueous sulfuric acid in 200 parts of water, cooled with 600 parts of ice. The mixture is then stirred at 0 to 5° C. for one hour and added to a solution of 20 parts of 3-methyl-1-phenyl-5-pyrazolone with 16 parts of caustic soda in 300 parts of water. The mixture is stirred for several hours to complete the coupling reaction. A solution of 62.5 parts of hydrated copper sulfate and 180 parts of 26° Bé. aqua ammonia in 250 parts of water are added, and the resulting mixture heated at 95 to 98° C. for 10 hours. The resulting coppered dyestuff is salted out with sodium chloride, filtered off, and dried. The formula of the resulting dyestuff is as follows:

monoazo compound, and then coupling with 8-amino-1-naphthol-5,7-disulfonic acid.

Example 3

24.4 parts of dianisidine are tetrazotized, coupled with 7-amino-1-naphthol-3-sulfonic acid, and the resulting azo compound rediazotized as described in Example 1. After adjusting the pH to 6 to 7 with sodium bicarbonate, a neutral solution of 24.4 parts of 1-phenyl-5-pyrazolone-3-carboxy acid is added. After stirring 10 to 15 minutes, a neutral solution of 31.9 parts of 8-amino-1-naphthol-5,7-disulfonic acid and 40 parts of sodium carbonate in 200 parts of water are added. The mixture is slurried several hours and to the resulting thick slurry there are added 62.5 parts of hydrated copper sulfate, 46 parts of methylamine and 400 parts of water. The coppering treatment is completed by heating at 80 to 85° C. for 4 hours. The dyestuff is salted out, filtered and dried. Colorations similar to those obtained in Example 1 are produced with the resulting dyestuff on cotton. The dyeings are greener than in Example 1 and are fast to light and washing, especially on regenerated cellulose rayon subjected to anticrease treatment. The formula of the dyestuff of this example is approximately as follows:

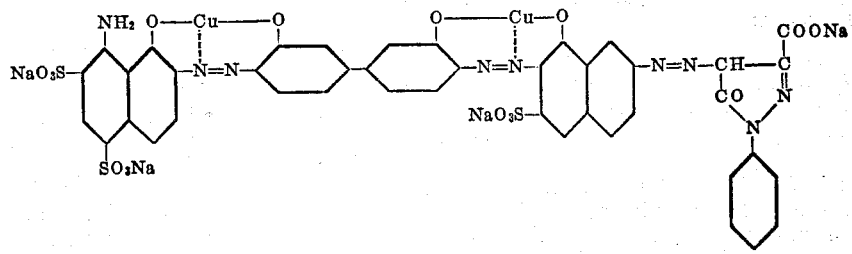

Example 4

24.4 parts of dianisidine are tetrazotized as in Example 1 and buffered by addition of 25 parts of sodium bicarbonate. A neutral solution of 31.9 parts of 7-amino-1-naphthol-3,6-disulfonic acid sodium salt in 200 parts of water is added slowly to produce a balanced coupling. The resulting slurry is acidified with 37 parts of 20° Bé. hydrochloric acid, cooled to 10 to 15° C. by addition of ice, diazotized by gradual addition of a solution of 6.9 parts of sodium nitrite in 20 parts of water. After stirring 1 to 2 hours, the mixture is neutralized with 20 parts of sodium bicarbonate to a pH of 5.5 to 7. A neutral solution of 25.4 parts of 3-methyl-1-p-sulfophenyl-5-pyrazolone in 200 parts of water is slowly added. After

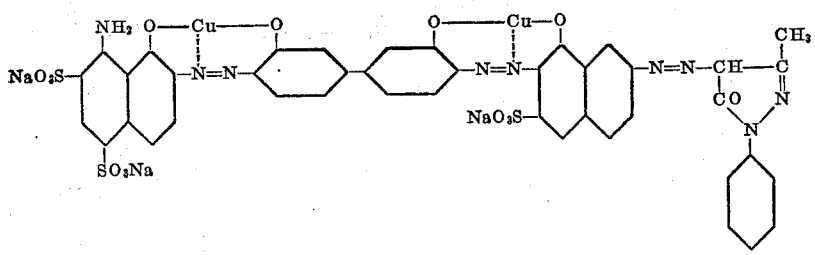

This product dyes cotton and regenerated cellulose rayon in very greenish-gray shades of outstanding fastness to light and washing.

By variation in coupling, somewhat redder shades are obtained, e.g. by coupling the initial diazo azo compound obtained from tetrazotized dianisidine and 1-amino-8-naphthol-5,7-disulfonic acid, with a monoazo compound prepared by coupling diazotized 7-amino-1-naphthol-3-sulfonic acid with 3-methyl-1-phenyl-5-pyrazolone; or by coupling dianisidine tetrazotized with the last named stirring 10 to 15 minutes, the mixture is treated with a solution of 35 parts of 8-amino-1-naphthol-5,7-disulfonic acid in a mixture of 40 parts of sodium carbonate in 200 parts of water. The resulting slurry is stirred several hours to complete coupling, and a solution of 62.5 parts of hydrated copper sulfate and 46 parts of methylamine in 400 parts of water is added, and the mixture heated at 80 to 85° C. for 4 hours to effect coppering. The reaction mixture is evaporated to dryness. The dyestuff obtained dyes cotton and regenerated cellulose rayon in greener shades of grey than the dyestuff of Example 1.

The dyeings are fast to light and washing, and the formula of the dyestuff is approximately as follows:

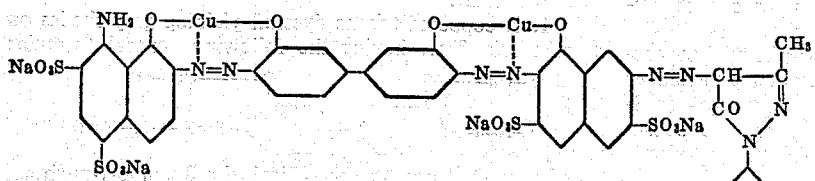

Example 5

A weakly alkaline solution of 23.9 parts of 6-amino-1-naphthol-3-sulfonic acid and 6.9 parts of sodium nitrite in 350 parts of water are slowly added to a stirred acid solution of 29 parts 20° Bé. hydrochloric acid in 100 parts of water, cooled with 400 parts of ice. The mixture is stirred 1 to 2 hours to complete diazotization, and then added to a neutral solution of 50 parts of sodium acetate and 25.4 parts of 3-methyl-1-p-sulfophenyl-5-pyrazolone in 200 parts of water. Coupling is completed in 1 to 2 hours, the final pH being 4.7. The pH is adjusted to 7.5 by adding caustic soda. The resulting solution is slowly to tetrazotized dianisidine prepared by tetrazotizing 24.4 parts of dianisidine as described in Example 1 and buffering the composition with 25 parts of sodium bicarbonate. A balanced coupling occurs as shown by disappearance of tetrazotized dianisidine from the mixture. A solution of 31.9 parts of 8-amino-1-naphthol-3,6-disulfonic acid and 30 parts of sodium carbonate in 200 parts of water is rapidly added. After stirring several hours, a solution of 62.5 parts of a hydrated copper sulfate and 46 parts of methylamine in 400 parts of water is added and the combined solutions heated 3 to 4 hours at 85° C. to form the copper complex. The dyestuff is salted out, filtered from the resulting slurry, and dried. The product dyes cotton and regenerated cellulose rayon in greenish-grey shades having excellent fastness to light and washing. The dyestuff has the following formula:

Example 6

24.4 parts of dianisidine are tetrazotized as in Example 1. 25 parts of sodium bicarbonate are added thereto, followed by slow addition of a neutral solution of 30.4 parts of 2-naphthol-3,6-disulfonic acid in 400 parts of water so as to obtain a balance point where no further tetrazo compound remains in the mixture. The resulting slurry is added to a solution of 23.9 parts of 7-amino-1-naphthol-3-sulfonic acid and 12 parts of sodium hydroxide in 400 parts of water. After stirring several hours to complete the coupling reaction the slurry is treated with 85 parts of 20° Bé. hydrochloric acid followed by a solution of 7 parts of sodium nitrite in 20 parts of water. The mixture is stirred about one hour to complete the diazotization and then added to a solution of 28 g. of 3-methyl-1-p-sulfophenyl-5-pyrazolone and 17 g. of sodium hydroxide in 300 parts of water. The mixture is agitated several hours to complete the reaction. A solution of 62.5 parts of hydrated copper sulfate and 46 parts of methylamine in 400 parts of water is added and the resulting slurry is heated at 85 to 90° C. for 4 hours. The resulting dyestuff is evaporated to dryness. This new dyestuff has the following formula:

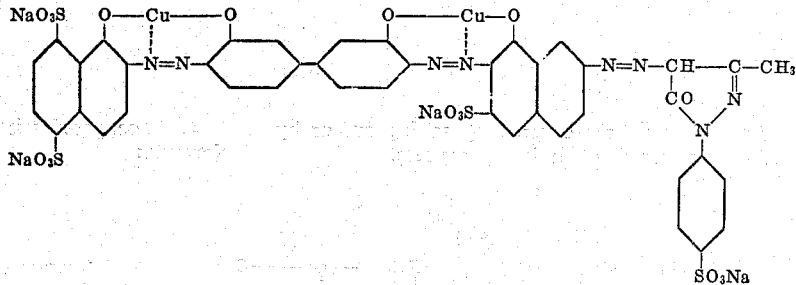

This product dyes cotton and regenerated cellulose rayon in greenish gray shades of outstanding fastness to light and washing. If in the above example 36.1 parts of 8-acetylamino-1-naphthol-3,6-disulfonic are substituted for 30.4 parts of 2-naphthol-3,6-disulfonic acid an excellent product results which dyes cotton and rayon considerably greener shades of gray.

Similar results are obtained in the foregoing examples by substituting other naphthol and aminonaphthol sulfonic acids for 8-amino-1-naphthol-5,7- or -3,6-disulfonic

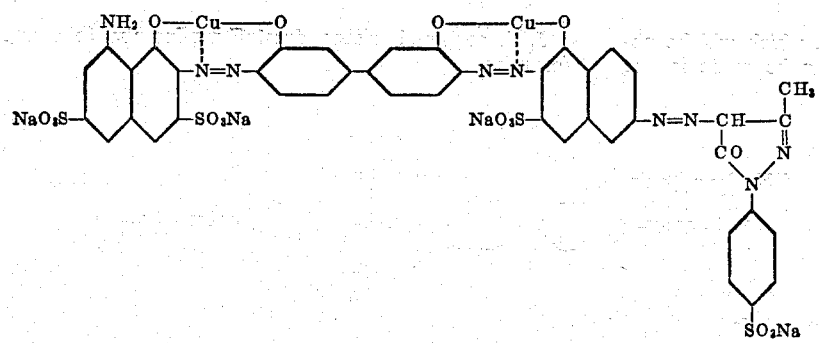

acids employed for preparing the dyestuffs described above. Similarly, in addition to the 6- or 7-amino-1- naphthol-3-sulfonic acid and 7-amino-1-naphthol- 3,6-disulfonic acid of the examples, other 6- or 7-amino-1-naphthol-sulfonic acids or -disulfonic acids can be employed in the examples with similar results.

Instead of 3-carboxy- or 3-methyl-1-phenyl-5-pyrazolone or the p-sulfo derivatives thereof, other pyrazolones such as 3-methyl-5-pyrazolone itself or 3-methyl- or 3-carboxy-1-(m-sulfophenyl)-5-pyrazolone can be substituted with similar results. The sulfophenyl pyrazolones are preferred.

The preferred method of preparing the dyestuffs of the invention involves tetrazotizing 1 mol of dianisidine, coupling in alkali metal bicarbonate buffering solution with 1 mol of a 6- or 7-amino-1-naphthol-sulfonic acid or -disulfonic acid, rediazotizing and coupling with 1 mol of the pyrazolone end compound, and finally coupling with 1 mol of a naphthol- or aminonaphthol-mono- or disulfonic acid. The product is then converted to the copper complex by heating at temperatures of 75–100° C. in a solution of copper sulfate with a water-soluble primary aliphatic amine or ammonia.

The dyestuffs can be recovered by salting out or by evaporating the resulting solution to dryness.

Other variations and modifications, which will be obvious to those skilled in the art, can be made in the foregoing examples, without departing from the scope of the invention.

We claim:

1. A coppered trisazo dyestuff yielding grey shades on cellulosic fiber, having the following general formula:

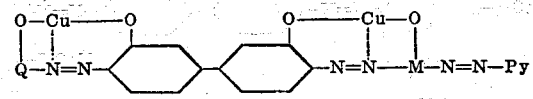

wherein Q represents the radical of a 8-amino-1-naphthol sulfonic acid end coupling component containing not more than two sulfonic acid groups, M represents the radical of a middle coupling component of the class consisting of 6- and 7-amino-1-naphthol-mono- and disulfonic acids, and Py represents the radical of a pyrazolone end component.

2. A dyestuff as defined in claim 1, wherein the pyrazolone coupling component is the radical of a 1-sulfophenyl-5-pyrazolone.

3. A coppered trisazo dyestuff having the following formula:

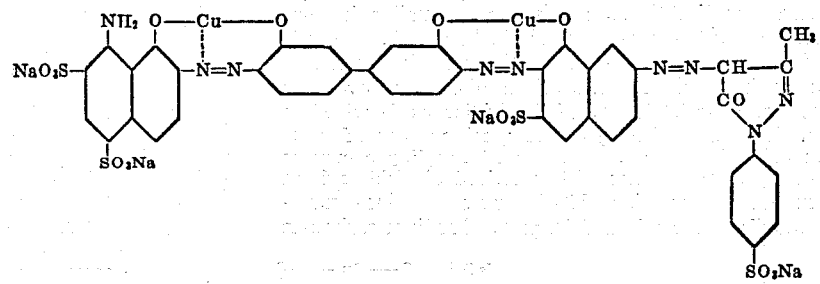

4. A coppered trisazo dyestuff having the following formula:

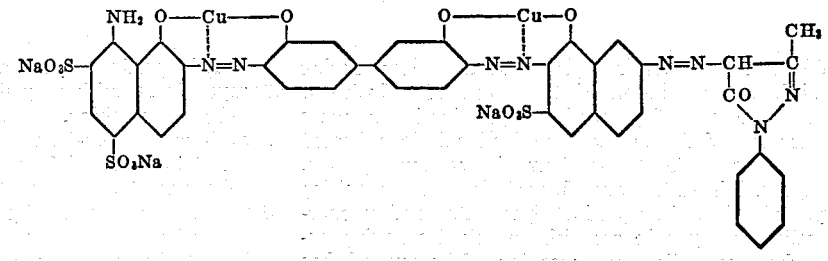

5. A coppered trisazo dyestuff having the following formula:

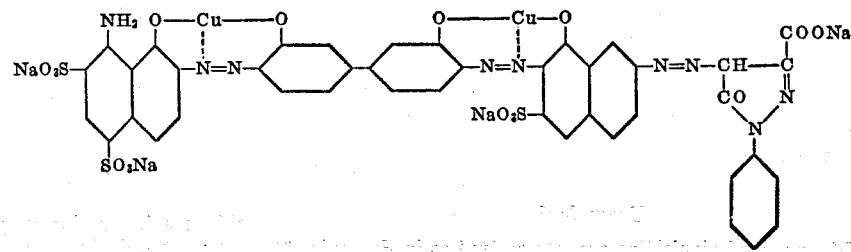

6. A coppered trisazo dyestuff having the following formula:
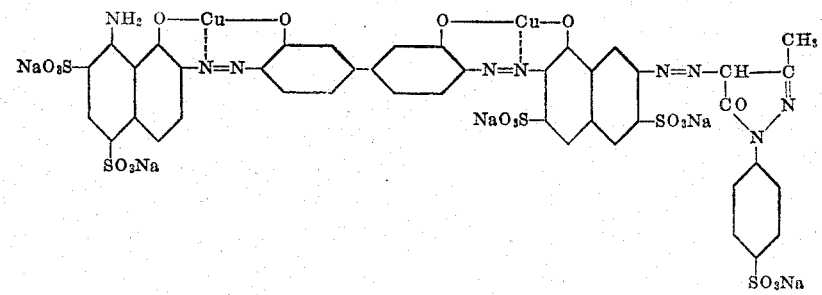
7. A coppered trisazo dyestuff having the following formula:
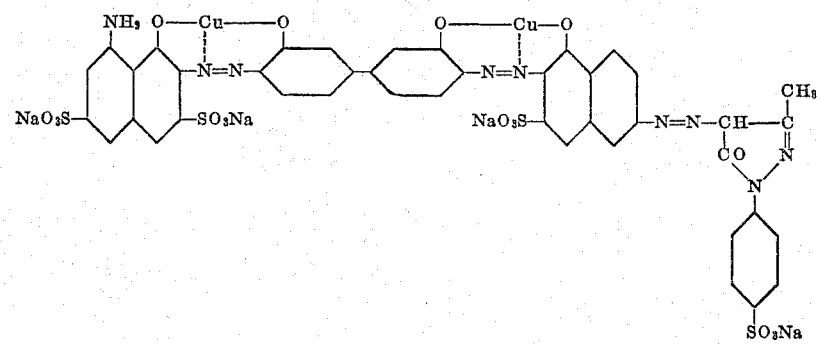
References Cited in the file of this patent
UNITED STATES PATENTS
| | | |
|---|---|---|
| 2,644,813 | Ruckstuhl et al. | July 7, 1953 |
| 2,715,120 | Ruegg et al. | Aug. 9, 1955 |

UNITED STATES PATENT OFFICE
CERTIFICATION OF CORRECTION

Patent No. 2,970,993                                  February 7, 1961

Jack F. Morgan et al.

It is hereby certified that error appears in the above numbered patent requiring correction and that the said Letters Patent should read as corrected below.

Columns 5 and 6, lines 35 to 48, the formula should appear as shown below instead of as in the patent:

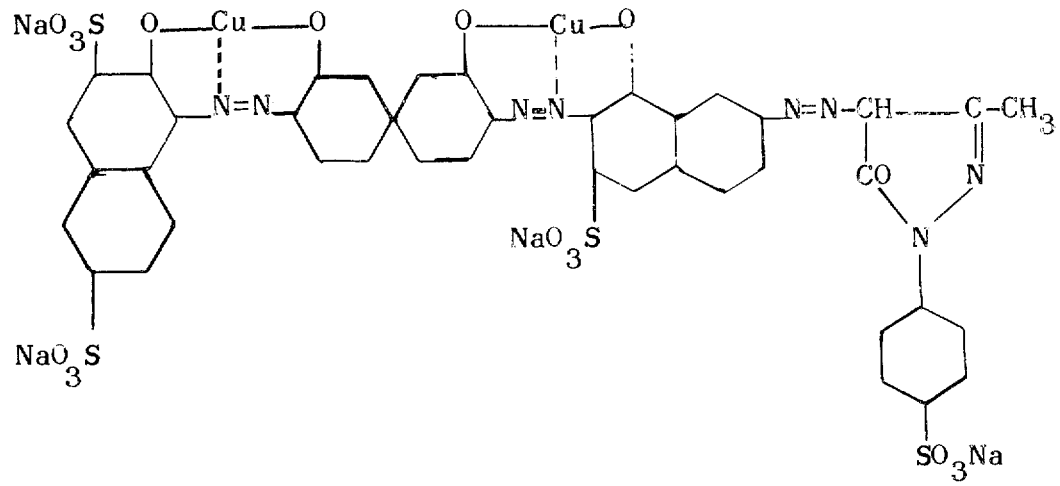

Signed and sealed this 3rd day of July 1962.

(SEAL)
Attest:

ERNEST W. SWIDER
Attesting Officer

DAVID L. LADD
Commissioner of Patents